Feb. 20, 1951 K. R. McCONNELL 2,542,152

SIGNAL INVERTER FOR FACSIMILE RECORDING

Filed Oct. 21, 1947

INVENTOR.

BY K. R. McConnell

E. R. Evans

Atty.

Patented Feb. 20, 1951 2,542,152

UNITED STATES PATENT OFFICE 2,542,152

SIGNAL INVERTER FOR FACSIMILE RECORDING

Kenneth R. McConnell, Red Bank, N. J., assignor to Times Facsimile Corporation, New York, N. Y., a corporation of New York Application October 21, 1947, Serial No. 781,027

2 Claims. (Cl. 250—27)

The present invention relates to facsimile apparatus for electrically recording pictures, messages or other subject-matter in response to signals either of the marking and spacing type or those employed in the "half-tone" or modulation form of transmission, and more particularly to a system of this character wherein provision is made for reversing or inverting the recording effect produced by the received signals.

In a preferred form of the invention, the signal energy changes from maximum to minimum values which, when applied to a recording device produces so-called black and white recording on a sensitized or current-responsive recording sheet. In "positive" recording, the lines are black; hence maximum or marking signals represent black in positive transmission. Sometimes it is desirable to invert the signals, as in the case of negative transmission where a positive recording is to be made.

Accordingly, an important object of the invention is to provide a stable and effective arrangement for recording facsimile signals either directly or in the inverted sense, at the option of the receiving operator, i. e., the maximum keying signal records either black or white, as desired. While reference has been made to maximum and minimum amplitude signals, it is to be understood that another characteristic of the signal energy, for example, the frequency may be varied to effect transmission of the facsimile picture or copy, as well known by those skilled in the art.

Another object of the invention is to provide an improved modulator for a facsimile recorder unit.

Figure 1:
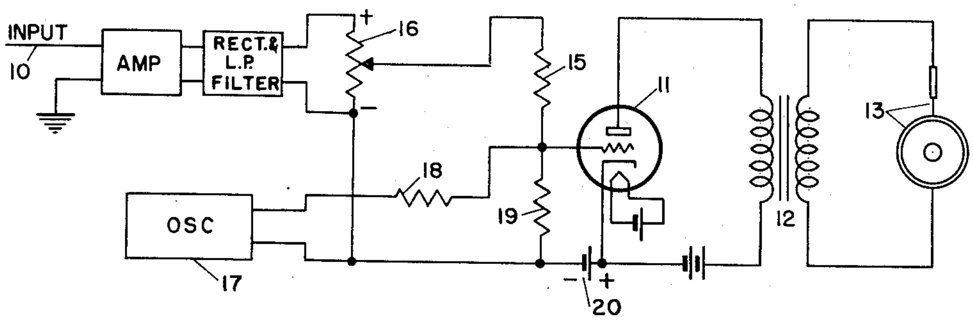

Other objects and advantages of the invention will appear from the following description of the preferred embodiment of the invention shown in the accompanying drawings, wherein Fig. 1 is a diagrammatic representation of a tele-facsimile recording system; and Figs. 2 and 3 are graphs which are referred to in explaining the operation of the system shown in Fig. 1.

In accordance with one form of the invention, the recording system includes a modulator-amplifier tube with an associated oscillator or oscillation generator, the tube being normally biased beyond plate current cut-off so that normally no current flows in the output circuit of the tube to the stylus or other recording means. Signal energy is applied to said modulator-amplifier tube in such a manner that the signal energy level determines whether the recording is positive or negative; i. e., whether the maximum or minimum facsimile keying signal causes current to flow in the output circuit to the recording means. Thus, by providing a manual gain control, recording can be made in the usual manner or the sense of the recording can be inverted if desired.

In accordance with another form of the invention, the modulator-amplifier tube is normally positively biased, and the keying signal applied with polarity opposite to that described above.

Referring to Fig. 1 of the drawing, there is shown a tele-facsimile recording system in which the facsimile signals are received over the conductor 10. The received signal energy, after being amplified and rectified, is employed to control a modulation arrangement consisting of a modulator-amplifier tube 11 having its output circuit connected through transformer 12 to recording means 13, which is shown by way of example, as of the stylus or current-recording type employing a drum. The tube 11 may be an ordinary triode as shown, comprising cathode, anode and grid or control electrode, or may be any other electron tube preferably of the sharp cut-off type, including a tetrode or other multigrid tube. The signal energy received over the transmission circuit or channel is impressed upon the grid of tube 11 through a resistor 15, and a potentiometer or other gain-control means 16 is provided to regulate the level of the facsimile keying signals impressed upon the tube. The output current of an oscillation generator 17 is also impressed upon the grid of said tube 11 through a resistance 18. A leak resistor 19 is also shown bridged across the grid and cathode elements of tube 11, said tube being normally biased beyond plate current cut-off by a source of potential such as a battery 20.

It may be assumed, for purposes of explanation, that the marking and spacing keying signals are represented by maximum and minimum amplitude signals and that the gain control 16 is designed to adjust the level of the minimum spacing signal so that for normal or direct recording the plate current in the tube 11 is cut off on spacing signal, but when the signal level is raised by the gain control 16 to effect inverted recording, the minimum spacing keying signal raises the bias of the tube 11 until the tube acts as a class A amplifier for the alternating-current output from the oscillator 17. It is also assumed that the amplitude of the current or oscillations delivered by the oscillator 17 to the grid of the tube 11 is of sufficiently small amplitude that no signal output is produced in the output circuit of the tube 11 unless the grid bias effected by the battery 20 is decreased by the facsimile keying signal applied through resistor 15. Preferably the resistors 15 and 18 are of high resistance compared to the grid-to-cathode impedance of the tube 11 under positive grid potential condition, for example, of the order of 10,000 to 100,000 ohms.

Figure 2A:
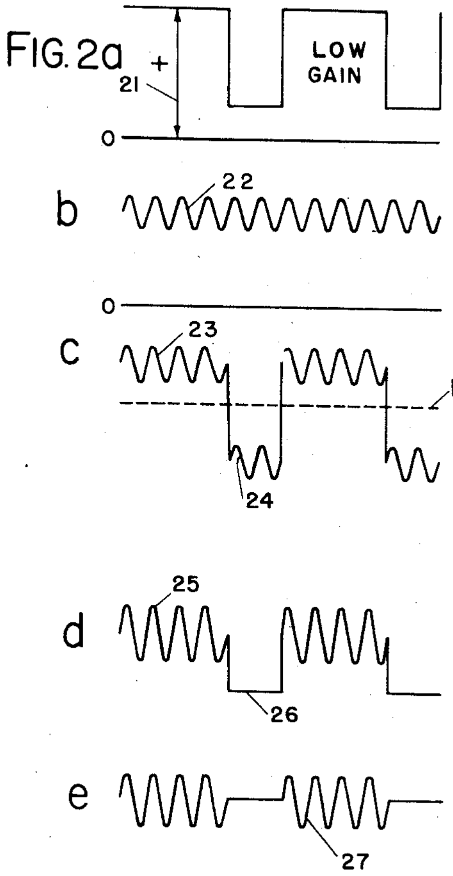

The operation of the recording system may best be explained with reference to Figs. 2 and 3, illustrating the signal current conditions in the respective circuits. Fig. 2*a* is a graph representing the variation in the facsimile keying signal as impressed upon the grid of the tube 11. The maximum (marking) value of the signal voltage is represented by the arrow 21 and may be for example, 3 or 4 volts. Fig. 2*b* represents the continuous alternating-current wave or oscillations impressed upon the grid of the tube 11 from the oscillation generator 17. The sum of these two voltages raises and lowers the grid bias of the tube above and below the cut-off potential represented in Fig. 2*c* by $E_{co}$. The portion 23 of the resultant grid bias is above cut-off and current flows in the output circuit of tube 11 as shown by corresponding marking signal 25 of the curve in Fig. 2*d*. However, during the spacing signal, the grid bias is more negative than cut-off bias as represented by the portion 24 of the curve, and therefore during this spacing period, no current flows in the output circuit of the tube as indicated by 26 in Fig. 2*d*. Thus it will be apparent that marking signals result in the flow of current in the output circuit of the tube to produce a current flow through the recording means 13, as represented at 27 in Fig. 2*e*, whereas the spacing signals or minimum keying signals do not cause current flow in the recording means. Therefore, recording in the positive sense is obtained on the sensitized or electro-responsive paper associated with the recorder lamp or stylus in the recording circuit of the tube.

Figure 3A:
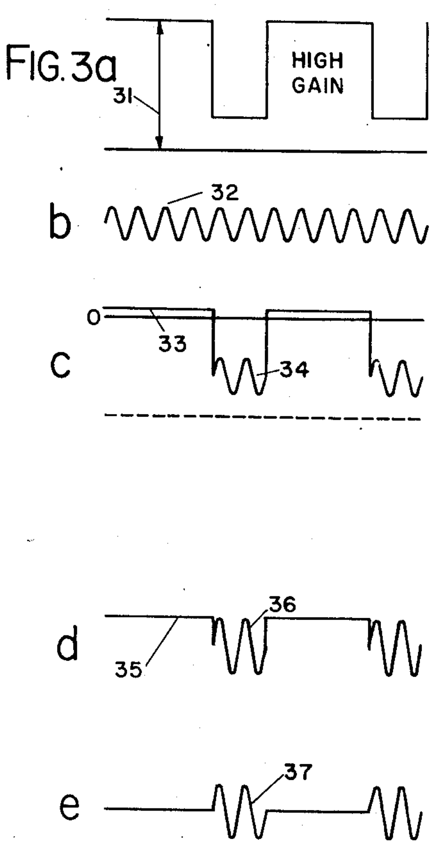

With the arrangement shown, in order to invert the sense of the recording from positive to negative, it is only necessary to raise the level of the keying signals impressed upon the modulator-amplifier tube 11. For example, if the gain control 16 is adjusted until the maximum (marking) signal impressed upon the tube 11 is of sufficiently high amplitude to cause the grid electrode to become positive with respect to the cathode, negative recording would be effected by the recording means 13. As indicated by the curve in Fig. 3*a*, the keying signal may be assumed to be of the same form as shown in Fig. 2*a*, but the amplitude represented by the line 31 may be three or four times as large as the amplitude of the marking signal 21, for example, 12 to 15 volts for the conventional small triode used as modulator 11. The amplitude of the alternating voltage applied to the grid from the oscillation generator as shown in Fig. 3*b* may be the same as that of the voltage wave 22 shown in Fig. 2*b*. The sum of the voltages impressed upon the grid of the tube 11 is shown in Fig. 3*c*. During the marking period the grid bias is a maximum and the grid becomes positive with respect to the cathode by reason of the adjustment of the gain control 16 as stated above. Under this condition, the grid-to-cathode impedance is very low, and being considerably lower than the impedance of the circuit connections to the gain control 16 and oscillation generator 17, the output of the keying system and the oscillation generator are both highly attenuated as indicated at 33 in Fig. 3*c*. Accordingly, no output signal wave appears in the output circuit of the tube 11, during the marking period represented at 35, Fig. 3*d*. However, when minimum or spacing keying signal is applied to the grid as is represented by the portion 34 of the curve shown in Fig. 3*c*, the grid bias is reduced to the point where the tube 11 acts as a class A amplifier for the oscillations and accordingly an alternating output signal is produced as shown at 36 in Fig. 3*d*. Hence a marking signal 37 is produced in the secondary of transformer 12 which records a marking effect on the recording means 13. The sense of the recording is thus reversed since no recording is effected on the received marking signal, but only on the spacing signal received over the line or transmission channel.

It will be apparent that inversion of the recording is effected by the system, according to the invention, by simply increasing the signal level impressed upon the modulator-amplifier tube 11 and without otherwise adjusting the characteristics or circuits of the tube or its related energizing or controlling components. The inverting system is therefore simple to operate and extremely stable in adjustment.

It will be evident that resistors 15 and 18 merely impart desired impedance characteristics to the signal input and oscillator circuits, and may be omitted if said circuits are inherently of the desired output impedance. Furthermore while biasing the tube 11 beyond plate-current cut-off is described and preferred, inversion of the recording can also be accomplished by variation of signal level if the grid is positively biased and the keyed signal polarity is reversed from that shown. The operation is essentially the same as that described above and inverted recording occurs with high signal input.

While one embodiment of the invention has been described in detail for the purpose of explaining the underlying principles thereof, it will be understood that various modifications and rearrangements of the system may be made without departing from the scope of the invention.

I claim:

1. In a facsimile recorder, in combination, an input signal circuit, means including a potentiometer in said circuit for adjusting the signal level for either normal or inverted recording, a triode provided with cathode, anode and control electrode or grid, a connection between said potentiometer and the grid of said triode, said connection including a series resistance which is relatively high compared to the grid-to-cathode impedance of said triode when the grid is positive with respect to said cathode, an oscillator connected across the cathode and grid of said triode, the connection of the oscillator to said grid including a series resistance which is relatively high compared to the grid-to-cathode impedance of said triode when the grid is positive with respect to said cathode, and a source of grid-biasing potential for normally biasing said grid beyond plate-current cut-off, the amplitude of the grid-biasing potential being greater than the amplitude of the signal impressed upon said grid by said oscillator with minimum input signal from said signal circuit when the signal level is adjusted for normal recording whereby no signal is generated in the output circuit of the triode until the input signal increases above said minimum value.

2. In a facsimile recorder, in combination, an input signal circuit, means including a potentiometer in said circuit for adjusting the signal level either for normal or inverted recording, an electron tube having at least a cathode, an anode, and a control electrode for controlling the anode current thereof, a connection between said potentiometer and said control electrode, said connection including a series resistance which is relatively high compared to the impedance between said control electrode and cathode when said control electrode is positive with respect to said cathode, an oscillator connected across the cathode and control electrode of said tube, the connection of said oscillator to said control electrode including a series resistance which is relatively high compared to the impedance between said cathode and control electrode when said control electrode is positive with respect to said cathode, and a source of biasing potential for normally biasing said control electrode beyond plate current cutoff, the amplitude of the said biasing potential being greater than the amplitude of the signal impressed on said control electrode from said oscillator with minimum input signal level from said signal circuit when the signal level is adjusted for normal recording whereby no signal is generated in the ouput circuit of said tube until the input signal level increases above said minimum.

KENNETH R. McCONNELL.

REFERENCES CITED

The following references are of record in the file of this patent:

UNITED STATES PATENTS

| Number | Name | Date |
|---|---|---|
| 1,822,000 | Young | Sept. 8, 1931 |
| 1,849,865 | Davis | Mar. 15, 1932 |
| 1,979,484 | Mathes | Nov. 6, 1934 |
| 2,388,769 | Shaffer | Nov. 13, 1945 |
| 2,415,229 | Young | Feb. 4, 1947 |
| 2,442,561 | Finch | June 1, 1948 |
| 2,469,860 | Cockrell | May 10, 1949 |
| 2,490,025 | Bryan | Dec. 6, 1949 |